United States Patent [19]

Sudama et al.

[11] Patent Number: 5,165,020
[45] Date of Patent: Nov. 17, 1992

[54] TERMINAL DEVICE SESSION MANAGEMENT PROTOCOL

[75] Inventors: Ram Sudama, Concord; Thomas C. Porcher, Stow, both of Mass.; Jerrold S. Leichter, New Haven, Conn.

[73] Assignee: Digital Equipment Corporation, Maynard, Mass.

[21] Appl. No.: 777,430

[22] Filed: Oct. 11, 1991

Related U.S. Application Data

[63] Continuation of Ser. No. 283,377, Dec. 12, 1988, abandoned, which is a continuation of Ser. No. 32,152, Mar. 27, 1987, Pat. No. 4,791,566.

[51] Int. Cl.⁵ .................. G06F 15/16; G06F 13/00
[52] U.S. Cl. ..................... 395/200; 364/DIG. 1; 364/232.1; 364/284; 364/228.4; 364/228.2
[58] Field of Search ................ 395/200, 650, 700

[56] References Cited

U.S. PATENT DOCUMENTS

| | | | |
|---|---|---|---|
| 4,348,739 | 9/1982 | Deaver et al. | 364/900 |
| 4,586,134 | 4/1986 | Norstedt | 364/200 |
| 4,642,758 | 2/1987 | Teng | 364/200 |
| 4,648,061 | 3/1987 | Foster | 364/900 |
| 4,677,588 | 6/1987 | Benjamin et al. | 364/200 |
| 4,677,616 | 6/1987 | Franklin | 370/94 |
| 4,679,189 | 7/1987 | Olson et al. | 370/60 |
| 4,691,314 | 9/1987 | Bergins et al. | 370/94 |
| 4,718,005 | 1/1988 | Feigenbaum et al. | 364/200 |
| 4,734,853 | 3/1988 | Nakano | 364/200 |

OTHER PUBLICATIONS

Stallings, William, "Data and Computer Communications", MacMillan Publishing Co., 1985, pp. 477-481, 510-528.
Prentice-Hall, *Protocols and Techniques for Data Communications*, 1981, 44-45, 344-352.
Pike, R., "The Blit: A Multiplexed Graphics Terminal," *AT&T Bell Laboratories Technical Journal*, Oct. 1984, vol. 63, No. 8, 1607-1631 X 28 Protocol, 1984.
Held, *Data Communications: A Comprehensive Approach*, 1983, McGraw-Hill, 1983, pp. 244-249.
Davies et al., *Computer Networks and Their Protocols*, 1979, pp. 43-44, 463.
IBM, Product Announcement, *New Cartridges for IBM 3151/3163/3164 ASCII Display Stations Supporting Additional Features & Emulations* Jan. 26, 1988.
AFIPS Conference Proceedings, 1985, National Computer Conference, 15-18 Jul. 1985, AFIPS Press, (US) W. Turner; "Protocol implementation strategies in local area networks" pp. 611-617, column 2, line 35-column 9, line 21; FIGS. 1,2,3.

(List continued on next page.)

*Primary Examiner*—Kevin A. Kriess
*Attorney, Agent, or Firm*—Cesari and McKenna

[57] ABSTRACT

The invention provides a new and improved system for transferring information between a host system and a terminal system. A digital data processing system includes a host computer system which runs processors and a terminal system which is connected to the application host computer system over a communication link. The terminal system includes one or more virtual terminals each of which allows an operator to enter information and allows output information to be displayed. The association between a terminal device and an application process is a session. Initially, a session is selected by means of a command transferred over the communications link. Thereafter, information, associated with the selected session, may be transferred over the communication link. This may continue until another session is selected. This transfer system minimizes the amount of control information which is required to identify the particular session with which data being transmitted over the communications link is associated. Once a session is selected, it remains selected until another session is selected, after which the data transmitted is associated with the newly selected session.

30 Claims, 6 Drawing Sheets

OTHER PUBLICATIONS

IBM Technical Disclosure Bulletin, vol. 29, No. 4, Sep. 1986, (N.Y., US) "Method to manage device resources in a multiple virtual machine system", pp. 1604-1605 (see whole document).

I.E.E.E. Transactions on Industrial Electronics, vol. IE-34, No. 1, Feb. 1987, (N.Y., US), S. R. Dillon: "Upper layer protocols and their use in MAP", pp. 24-28, FIG. 2; column 4, lines 42-44; column 4, line 50; column 5, lines 13-20; column 7, line 37 column 8, line 2.

Alta Frequenza, vol. 54, No. 6, Nov./Dec. 1985, (Milano, IT) S. Alfonzetti et al., "SDL description of the ISO transport protocol":, pp. 386-393, tables 1,2; column 5, line 24; column 5, line 30-column 6, line 27.

Microprocessing and Microprogramming, vol. 15, No. 2, Feb. 1985, (Amsterdam, NL), Y. S. Moon et al., "Design and implementation of a nected to a time sharing system", pp. 85-93, see FIGS. 4,5,6; column 5, line 38-column 10, line 32.

TERMINAL DEVICE SESSION MANAGEMENT PROTOCOL

This is a continuation of U.S. patent application Ser. No. 07/283,377, filed Dec. 12, 1988, now abandoned, which is a continuation of U.S. patent application Ser. No. 07/032,152, now U.S. Pat. No. 4,791,566.

FIELD OF THE INVENTION

This invention relates generally to the field of digital data processing systems, and more specifically to a terminal device which employs a session management protocol that allows one or more operators to selectively access and use several application processes over a single communications link.

BACKGROUND OF THE INVENTION

As computers have become more sophisticated, it has become possible to run two or more programs, or application processes, concurrently on a single computer system. This capability, known as multitasking, or multi-programming, has been made possible by the development of large, very fast, processors that can switch between programs either at selected intervals, or when some event happens in the system, such as data transfer to or from a mass storage device, which does not require processor time. More recently, networks of smaller computers have permitted slower computers to be linked together to allow the sharing of programs and data to achieve concurrent processing.

Since computer systems can run multiple application processes concurrently, their users now find it desirable to be able to frequently switch between two or more processes that are running on the system. For instance, personnel in a manufacturing facility may want to selectively monitor and control different manufacturing steps that may be controlled by the system. Personnel in a financial office may want to access records of the most recent transactions, records of past transactions, and also to send and receive electronic mail. Typically, a user's access to a computer system is through a single or virtual terminal that comprises a video display-keyboard combination, such as a word processing station, or a personal computer connected to the primary system.

Another advantage of a computer system's ability to run a number of application processes concurrently is that it has become possible to connect a component to the system which may have selective access to all of the processes running on the system. For instance, it may be desirable to connect to the system an intelligent printer which can select the order of printing among a number of print requests presented to it. Alternatively, a master processor may be connected to the system to monitor the processes running on a number of slave processors so as to control all the processes running on the system.

The processor units, terminals and other components of many computer systems are often connected together by a single communications link. Typically, these components are connected to each other by a common bus. Connecting components in this manner minimizes the number of input/output ports that each component has to be provided with, and also reduces the number of communications links needed to connect all the components together.

Frequently there is a need to provide the virtual terminals that are part of a computer system with a means to rapidly access the programs running on the system. This access function, or switching capability, enables the virtual terminal's user to selectively monitor the processes and specifically receive processed data therefrom, and to transmit information in the form of data to be processed, or commands for processing the data to the process being monitored. Typically, a switching protocol is provided so information may be selectively transmitted to or received from the different processes running on the system over the single communications link to and from the terminal device.

Currently, many computer systems use a packet-switching protocol wherein packets of information are sent to and from the terminal and other components that are part of the computer system. Each packet comprises a header field followed by an information field. The header field contains control information such as address information which identifies the intended recipient of information contained in the information field. For example, a user may have a virtual terminal set to observe, or "window" two programs operating on a system. Header fields in packets, transmitted from the system to the virtual terminal, insure the displayed window contains data from the program being monitored in that window. In transmissions from the virtual terminal, the header fields identify the application processes to which the information is directed, and if necessary, the processor on which the process is running. Packet switching, thus, makes it possible to transmit information regarding multiple application processes over a single communications link.

However, there are limitations associated with packet switching. In each packet the information field must be preceded by a header field, and so the time required to transmit the header fields reduces the amount of time during which information, whether data or program commands, may be transmitted over the communications link. Moreover, the virtual terminals and the other system components must spend time generating header fields for transmitted packets, decoding header fields of received packets, and directing the flow of the information in the packets to the intended recipient.

SUMMARY OF THE INVENTION

The invention provides a new and improved system for transferring information between a host system and a terminal system in a digital data processing system.

In brief summary, a digital data processing system includes a host computer system which runs application processes and a terminal system which is connected to the host computer system over a communications link. The terminal system includes one or more virtual terminals each of which allows an operator to enter information for use by the application processes and allows output information from the processes to be displayed. The association between a terminal device and an application process is a session. Initially, a session is selected by means of a command transferred over the communications link. Thereafter, information associated with the selected session may be transferred over the communications link. This may continue until another session is selected. Command packets may be multiplexed with the information to be transferred to control other sessions without selecting another session.

The new information transfer system minimizes the amount of control information which is required to identify the particular session with which data being transmitted over the communications link is associated.

This is because once a session is selected, it remains selected until another session is selected, after which the data transmitted is associated with the newly selected session. Since the amount of time control information that must be sent is minimized, the amount of time available to send data is maximized.

BRIEF DESCRIPTION OF THE DRAWINGS

The invention is pointed out with with particularity in the appended claims. The above and further advantages of this invention may be better understood by references to the description taken in conjunction with the accompanying drawings, in which:

DETAILED DESCRIPTION OF THE PREFERRED EMBODIMENTS

Figure 1:
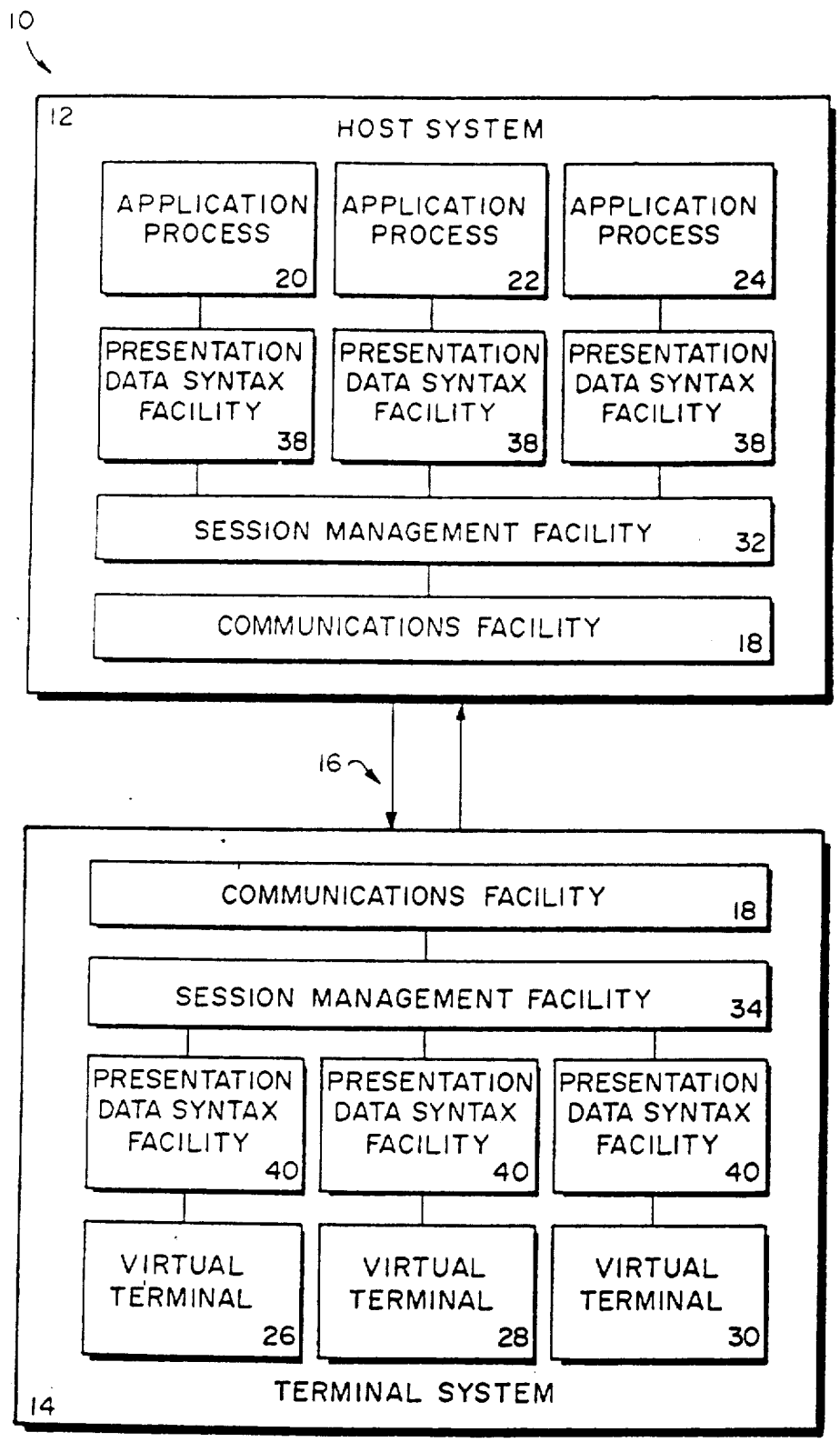
FIG. 1 is a general block diagram of a session management system implemented in accordance with this invention.

FIG. 1 depicts a system 10 comprising a host system 12 linked to a terminal system 14 by a single bi-directional communications link 16 such as a physical circuit. Both the host system 12 and terminal systems 14 have a communications facility 18 to encode and decode signals transmitted and received over the communications link 16. The communications facilities 18 may perform such functions as serializing parallel signals for transmission over the communications link 16; and formating serial signals received over the communications link into a parallel format.

The host system 12 represents a computer system on which one or more programs, or application processes, 20, 22, and 24, may be concurrently running. The terminal system 14 includes one or more video terminals or other terminal components represented by virtual terminals 26, 28, and 30. The virtual terminals 26, 28, and 30 may each selectively communicate with one or more application processes running on the host computer system 12. The application process-virtual terminal communication is over the communications link 16, which only allows a single information stream to be transferred in each direction between the host system 12 and the terminal system 14.

The communications link 16 typically allows two-way communication, thus, both the host system 12 and terminal system 14 may constitute a transmitter and a receiver. If information is sent from an application process 20, 22, or 24 to a virtual terminal 26, 28, or 30, the host system 12 will operate in a transmitting mode and the terminal system 14 will operate in a receiving mode. If the flow of information is in the opposite direction, then so are the operating modes of the host system 12 and terminal system 14. Thus, throughout this description and the application of the protocol, either the host or terminal system 12, 14 will function as the transmitting system, and the other system will be the receiving system. In a typical environment the communications link 16 is fully duplexed so both the host system 12 and the terminal system 14 can transmit and receive information at the same time.

Using a terminal device session management protocol described herein, the host system 12 and terminal system 14 selectively transmit information between the application processes 20, 22, 24 and the virtual terminals 26, 28, 30 over the communications link 16. For example, virtual terminal 28 may be a video terminal used to monitor application processes 22 and 24. Using the session management protocol, the terminal user may select the process 22 or 24 with which it exchanges information. Alternatively, virtual terminal 30 may be an intelligent printer which accepts print requests from all the application processes 20, 22, and 24, establishes a priority for them, and prints the print request with the highest priority.

Session management facilities 32 and 34 which are parts of the the host system 12 and terminal system 14, respectively, control the flow of information between the application processes 20, 22, 24 and the virtual terminals 26, 28, 30 in accordance with the session management protocol. The host system session management facility 32 maintains a mapping of the relationships, called sessions, between the application processes 20, 22, 24 and the virtual terminals 26, 28, 30. When information is sent from one of the virtual terminals to one of the application processes, the facility 32 identifies a session and transfers it to the appropriate application process 20, 22, or 26. The terminal system session management facility 34 maintains a similar set of mappings for when information is sent from one of the application processes 26, 28, or 30 to one of the virtual terminals 20, 22, or 24. As will be discussed hereinafter, the system transmitting information selects a specific session to be active depending on where it wants the information directed. Selecting a session is, in effect, accessing a component through time division multiplexing with random accessing so information will be directed to it until another component is selected.

After a session has been selected, flow control is used to insure that the receiving system's capacity to buffer information is not exceeded by the transmitting system's ability to send it. The system that is receiving the information forwards a selected number of transmit credits to the system that is sending the information. The number of transmit credits are representative of the amount of information the receiving system can accept. As the transmitting system forwards the information, it reduces the number of transmit credits available. When the number of transmit credits is reduced to a selected value, the transmitting system stops forwarding information until it receives additional transmit credits from the receiving system. This insures that the transmitting system never sends more information than the receiving system can accept. This transmission credit scheme is bi-directional, that is, transmit credits can be sent in two directions and the rate of flow of information in one direction is independent of the rate of flow of information in the opposite direction.

Figure 2:
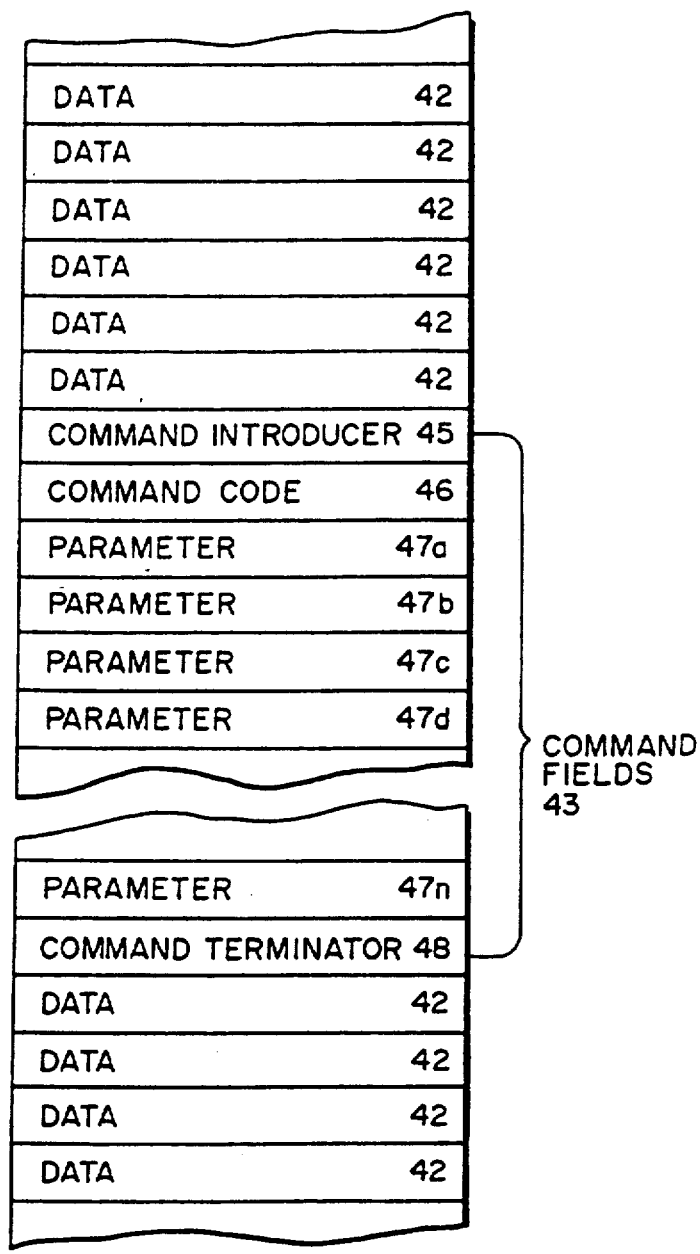
FIG. 2 is a diagram depicting the structure of the information transmitted between the host and terminal systems in accordance with this protocol.

FIG. 2 depicts the format of information sent over the communications link 16 after communications have been established. The information includes data fields 42 with command fields 43 interspersed therebetween. The data fields 42 comprise the information transmitted between the virtual terminals 26, 28, 30 and the application processes 20, 22, 24. All information relating to the application processes on the host system 12, including actual data and program commands, is transferred over the communications link 16 in the data fields 42.

The command fields 43 contain protocol information needed to operate the session management in accordance with this protocol. The protocol information includes, for example, the commands used to initiate and select a session and extend transmit credits, all of which will be discussed in more detail hereinafter. The command fields 43 are inserted into the information stream by the session management facility 38 or 40 transmitting them. The command fields 43 are removed by the receiving session management facility 40 or 38 prior to its coupling the contents of the data fields 42 to the receiving virtual terminal 26, 28, or 30 or application process 20, 22, or 24.

A command introducer field 45 is the first command field 43. This field is sent to the receiving session management facility 32 or 34 to indicate the start of a protocol command. Following the command introducer field 45 is an operation code field 46 which identifies the protocol command being sent. One or more parameter fields 47a,b, . . . , (generally identified by reference number 47) may follow the command operation code field 46. The parameter fields 47 contain information neccessary to execute the command. A command terminator field 48 is the last of the command fields 43. The command terminator field 48 indicates to the receiving session management facility 32 or 34 that the transmission of the current protocol command has been completed, and subsequent information will comprise either an additional protocol command, or information that should be coupled to the receiving application process 20, 22, or 24 or virtual terminal 26, 28, or 30.

With this background, the operation of the session management protocol will now be described in more detail. Between each application process 20, 22, 24 and the host session management facility 32, there is a presentation data syntax facility 38 and between each terminal device 26, 28, 32 and the terminal session management facility 34, there is a presentation data syntax facility 40. The presentation data syntax facilities 38 and 40 encode and decode information that is transmitted through them between the session management facility 32 or 34 and the associated application processes 20, 22, 24 or virtual terminals 26, 28, 30. Information is initially transmitted to the session management facility through the presentation data syntax facility 38 or 40, wherein it is encoded into a format recognizable by the session management facility. The transmitting session management facility forwards the encoded information over the communication link 16 to the receiving session management facility. The receiving session management facility then forwards the information to the receiving presentation data syntax facility wherein it is decoded into its original format recognizable by the receiving application process 20, 22, 24 or virtual terminal 26, 28, 30.

In one embodiment of the invention, the presentation data syntax facilities 38 and 40 format the information according to a "column/row" syntax defined by ANSI standard 3.4. Characters are identified by the individual elements of a 16 row by 16 column bit array. The elements of the array are defined by their column and row locations. The columns and rows are both numbered 0–15 so the first element in the array is 0/0 and the last is 15/15. For example, a character in column 2 and row 3 would be identified as 2/3. The format for any character can be determined by multiplying the column value by sixteen [left by 4] and adding the row value. Thus, the character 2/3 would have the syntax code of $35 = (2 \times 16) + 3$, and would be transmitted in binary as 00100011. This syntax allows 256 different characters to be transmitted between the systems.

When the session management protocol has been implemented between the host and terminal systems 12, 14, all the information that passes between the applications processes 20, 22, 24 and the virtual terminals 26, 28, 30 over the communications link 16 is in this format regardless of whether the protocol is in an OFF state, or the ENABLED, ACTIVE protocol that controls the flow if information over the communications link. These are two of the states of the system, as described below.

In accordance with the session management protocol, host system 12 and terminal system 14 may each be in one of four possible states; namely:

1) OFF. In this state, the session management protocol is not used to control the flow of information between the host system 12 and terminal system 14. Other protocols may be used to control the flow of information between the application processes 20, 22, 24 and the virtual terminals 26, 28, 30 over the communications link 16.

2) PENDING. In this state, the session management protocol is used to control the communication link 16. However, the only commands the host system 12 and terminal system 14 will recognize and act on are ENABLE, DISABLE, and REPORT-SESSION, each of which will be discussed hereinafter.

3) ENABLED, INACTIVE. In this state, the flow of information over the communication link 16 is controlled by the session management facilities 32, 34 in accordance with the session management protocol. However, the transmitting system has not selected a session to receive transmitted information. Since no session has been selected, the receiving system will discard all information sent until one is selected.

4) ENABLED, ACTIVE. In this state, the flow of information over the communications link 16 is controlled in accordance with the session management protocol. The information is sent from the transmitting system over the communications link 16 and is directed by the session management facility 34 or 32 in the receiving system to the appropriate application process 20, 22, 24 or virtual terminal 26, 28, 30.

The transition out of the OFF state is through the PENDING state. Transitions into and out of the OFF state are enabled by local requests originating from within host system 12 or to terminal system 14. Alternatively, the host system 12 or terminal system 14 may request the other system to execute such a transition. This insures that a system requested to operate session management in accordance with this protocol is not forced to do so unless its user desires such operation.

Transitions from the PENDING to the ENABLED, INACTIVE state occur as a result of requests transmitted over the communications link 16. The host system 12 usually initiates this transition by transmitting an ENABLE command to the termanal system 14 to start an enabling sequence, discussed in detail hereinafter. Normally, the terminal system 14 is not used to initiate an enabling sequence. However, the terminal system usually has the capability of expressly initiating this transition.

After the session management protocol passes into the ENABLED, INACTIVE state, sessions can be opened, and one open session selected to receive information in later transmitted data fields. Once a session has been selected, the session management facilities 32, 34 are both in the ENABLED, ACTIVE state with respect to this protocol, and information in the form of the data fields 42 will be transferred between the application processes 20, 22, 24 and the virtual terminals 26, 28, 30 in accordance with this protocol.

Sessions may be selected in either a blocking or a non-blocking mode. In the blocking mode, the same session is selected in both directions over the communications link 16. In other words, the application process 20, 22, 24 that transmits information to a virtual terminal 26, 28, 30 also receives information from the same application process.

In the non-blocking mode, sessions do not have to be the same. The information travelling in opposite directions over the communications link 16 can be transmitted between different application processes 20, 22, 24 and virtual terminals 26, 28, 30. Also, this allows options such as the transmission of the same information from an application process 20, 22, or 24 to multiple virtual terminals 26, 28, 30 and transmission of information in the opposite direction from only one virtual terminal back to the application process. Generally, whether the session management protocol is operated in the blocking or non-blocking mode is a function of the capabilities of the host systems 12 and terminal systems 14 to control multiple active processes.

A more complete understanding of the session management protocol may be gained by reference to FIGS. 3-8 which depict the specific protocol commands that are transmitted between the session management facilities 32, 34 to control the flow of information between the host system 12 and terminal system 14.

Figure 3:
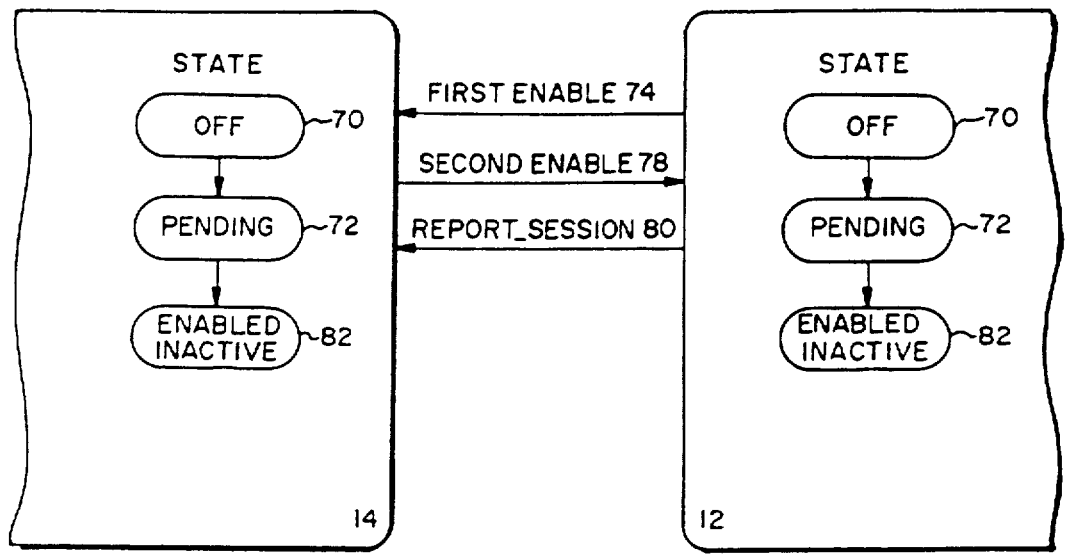
FIGS. 3 through 8 comprise diagrams depicting transfer of several of the commands transmitted between the systems depicted in FIG. 1 in accordance with this protocol.

FIG. 3 illustrates the sequence of commands used to transfer from the OFF state 70 to the ENABLED, INACTIVE state. Both the host system 12 and the terminal system 14 are initially in the OFF state 70 and pass into a PENDING state 72 in response to a local request. The host system session management facility 32 may make this transition in response to a request from one of the application processes 20, 22, or 24, or automatically in response to the activation of the terminal system 14. The terminal system session management facility 34 may only make this transition in response to a specific command from one of the virtual terminals 26, 28, 30. If one of the virtual terminals is a video display, the request may come from a command the user manually enters through the keyboard 26, 28, or 30.

After host system 12 and terminal system 14 are both in the PENDING state 72, the host system 12 may initiate the enabling sequence by transmitting an initiating FIRST ENABLE command 74. The terminal system 14 responds with an acknowledging SECOND ENABLE command 78, that includes an Enable State parameter in one of the parameter fields 47 (FIG. 2), indicating it is not currently in the ENABLE state. The host system responds to the second ENABLE 78 with a REPORT_SESSION command 80 having a Status parameter, in one of the parameter fields 47, indicating whether or not it can support the specific version of the session management protocol the terminal system is using. Both systems then pass into the ENABLED, INACTIVE state 82.

During this exchange both systems transmit Version Number and Session Limit parameters, in the parameter fields 47 (FIG. 2) following the Enable State parameters. The Version Number parameter indicates which version of the protocol the transmitting system 12 or 14 has. The Session Limit parameter indicates the maximum number of sessions it can concurrently support.

Figure 4:
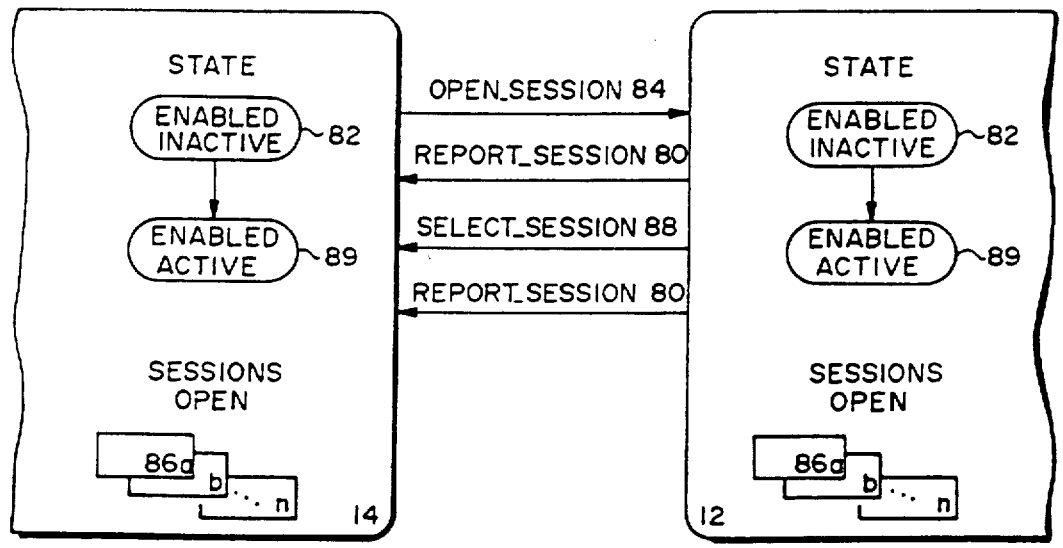

After the host system 12 and terminal system 14 are in the ENABLED, INACTIVE state 82 with respect to this protocol, individual sessions 86a, b . . . n (FIG. 4) can be established, or opened, and one of the open sessions 86a, b . . . n selected as the one through which data fields 42 are sent, as is illustrated by FIG. 4. Either the host system 12 or terminal system 14 may open a session 86a, b . . . or n by sending an OPEN_SESSION command 84 to the other. A Session ID parameter, in parameter fields 47 (FIG. 2) is sent with each OPEN_SESSION command to identify the session opened. The receiving system will then respond to the OPEN_SESSION command 84 with a REPORT_SESSION 80 indicating whether or not the session 86a,b, . . . n was successfully opened.

If the OPEN_SESSION command 84 is sent to a receiving system which has more than one application process 20, 22, 24 or with more than one virtual terminal 26, 28, 30, an Application Name parameter, and a Session Name parameter may be sent with the command in the parameter fields 47 (FIG. 2) following the Session ID parameter. These parameters are used by the session management facility 32 or 34 receiving the OPEN_SESSION command 84 to assign the session to the appropriate application process 20, 22, or 24, or virtual terminal 26, 28, or 30 and are not part of this invention. If these parameters are not sent with the OPEN_SESSION command 84, the receiving session management facility 32 or 34 should have means for automatically assigning the sessions 86 so the information is directed to the approriate destination.

After one or more sessions 86 have been opened, one may be selected to be active over the communications link 16. If the link is fully duplexed, and the session management facilities 32, 34 can operate in the non-blocking mode, different sessions can be selected in each direction along the link. The system that has information to transmit to a session 86a,b, . . . n initiates the selection process by transmitting a SELECT_SESSION command 88. A Session ID parameter identifying the session selected to be active is sent with this command in the parameter fields 47 (FIG. 2). After the system receiving the SELECT_SESSION command 88 has completed the session selection process, it sends a REPORT_SESSION command 80 to the transmitting system. After a session 86a,b . . . n has been selected to receive a character the systems are said to be in the ENABLED, ACTIVE state 89. The selected open session stays active until another one is selected.

Figure 5:
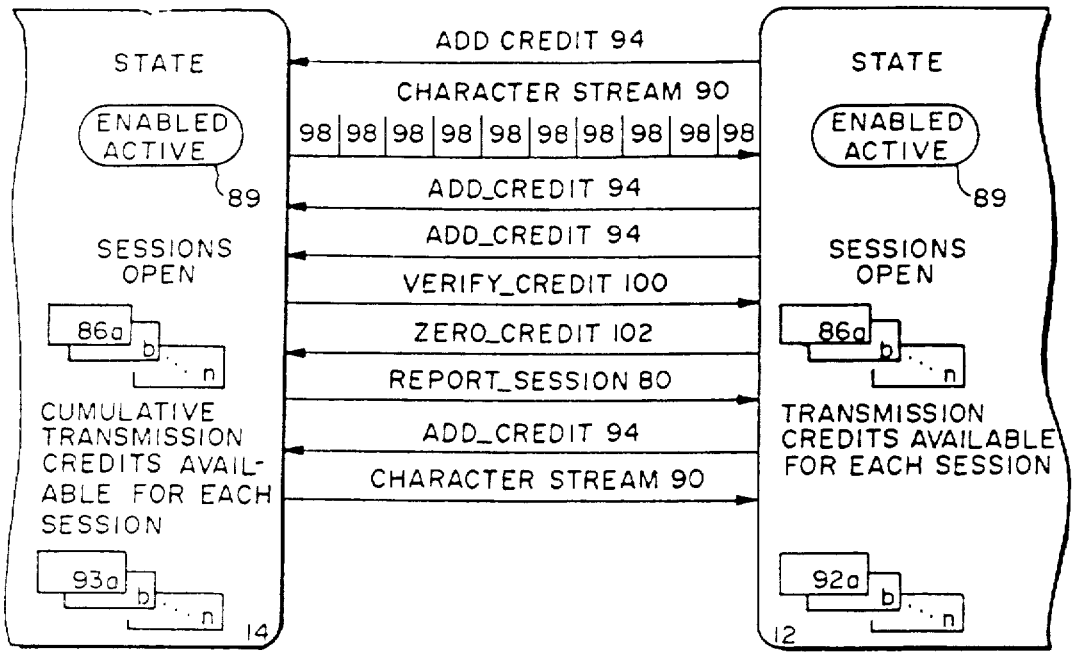

In order to forward data fields 42 between the host system 12 and the terminal system 14 in accordance with this protocol, the system transmitting the data fields must first receive transmit credits 92a,b . . . n from the receiving system. When a session 86a,b, . . . n is first opened, there are zero transmit credits. The receiving system sends an ADD_CREDIT command 94 to the transmitting system, as represented in FIG. 5, indicating the amount of buffer capacity it has available to store transmitted information. Transmitted with the ADD_CREDIT command 94, in the parameter fields 47 (FIG. 2) is a Session ID parameter for identifying the session 86a,b, . . . n, and a Transmit Credit parameter 93 that indicates the amount of storage capacity for that session. No response is required for this command and the transmitting system may send information, in data fields 42 (FIG. 2), as soon as it receives the credits 92.

In one embodiment of the invention, the transmit credits 92a,b, . . . or n are representative of the number of bytes of information the system receiving the data fields 42 can buffer. For each byte of data transmitted in a data field 42, the transmitting system deducts one from the transmit credits 92 available in a storage location within its session management facility, for that session, which were provided by the received ADD-CREDIT message.

At any time, the receiving system can send additional transmit credits 92 to the transmitting session by transmitting additional ADD_CREDIT commands 94. The transmission of the additional ADD_CREDIT commands 94 by a system does not interrupt its reception of data fields 42 that have been transmitted to it. The system receiving an ADD_CREDIT command 94 adds the additional transmit credits 92 received to those already in the storage location for that particular session.

It will be appreciated that if either the host system 12 or terminal system 14 receiving data fields 42 waits until the system transmitting it has zero available transmit credits 92a,b, . . . n, the flow of data fields 42 would be "stuttered", since the transmitting system waits until the receiving system has sent additional credits before restarting the flow of information. This may be an undesirable condition, and thus, in order to avoid it, it is recommended that the receiving system send transmit credits 92 before the transmitting system's stored credits reach a set minimum amount.

Moreover, some systems may transmit data fields 42 by the buffer, and will not forward the contents of a partially-full buffer if they cannot forward its entire contents. Thus, it is recommended that a set minimum number of transmit credits 92a,b, . . . n be sent whenever information is to be received.

If the system transmitting information has more information to send than available transmission credits 92a,b . . . n, or if an ADD_CREDIT command 94 is garbled, such as may happen if either the Transmit Credit or Session ID parameters are lost, transmitting system may send a VERIFY_CREDIT command 100 with a Session ID parameter in the parameter fields 47 (FIG. 2) identifying the specific session that needs resynchronization of transmit credits. The receiving system responds by sending a ZERO_CREDIT command 102 with a Session ID parameter in the parameter fields 47 for that session. This command zeros the available transmit credits 92a,b . . . n the transmitting system has in storage. The transmitting system responds with a REPORT_SESSION command 80. After the REPORT_SESSION is received, the receiving system 14 or 12 can again send transmit credits 92a, b, . . . n by way of additional ADD_CREDIT commands 94. As soon as the transmitting system receives the transmit credits 92a, b, . . . n, it may start to transmit information in data fields 42 again.

Figure 6:
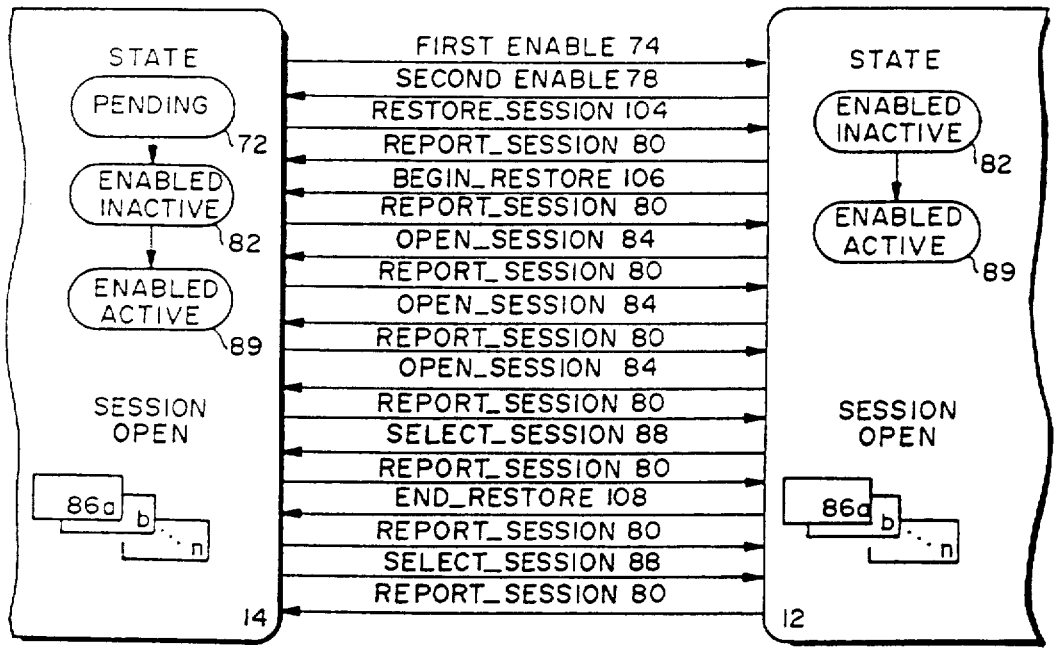

Session management in accordance with the protocol also provides a means for the warm restart of either the host system 12 or the terminal system 14 if one of them has lost session management information. This may occur when the system is temporarily disabled, such as may happen due to a power failure or operator error. As illustrated by FIG. 6, the "cold" system that lost information, and is in the PENDING state 72, initiates the process by sending an ENABLE command 74 to the warm system in order to intiate the enabling process.

The second, "warm," system responds with an second, acknowledging SECOND ENABLE command 78 with an Enable State parameter indicating that it was already in the ENABLE, INACTIVE state 82. The cold system responds to the SECOND ENABLE command 78 by transferring into the ENABLED, INACTIVE state 82 and transmitting a RESTORE_SESSION command 104 requesting that the warm system initialize the restore sequence. The warm system acknowledges this command with REPORT_SESSION command 80.

The warm system then starts the restore sequence with a BEGIN_RESTORE_command 106 that signals the initiation of the restore sequence. The cold system responds with a REPORT_SESSION command 80. After the REPORT_SESSION is received, the warm system responds with an OPEN SESSION sequence for each existing session 86. The warm system will also transmit a SELECT_SESSION command 88 in order to start transmitting data fields 42 to a selected application process 20, 22, or 24, or virtual terminal 26, 28, 30. After the cold system has completed the select session process, and transmitted a REPORT_SESSION command 80 as disclosed in the description of the select session process, the warm system will send an END_RESTORE command 108 indicating the completion of the restoration process. The restored system ackowledges the END_RESTORE command 108 with a REPORT_SESSION command. After the restoration is complete, the restored system 12 or 14 may transmit a SELECT_SESSION command 88 for the session it will be active to transmit to. Thus, at the end of the restore sessions sequence, both systems 12, 14 are in the ENABLED, ACTIVE state 89.

Figure 7:
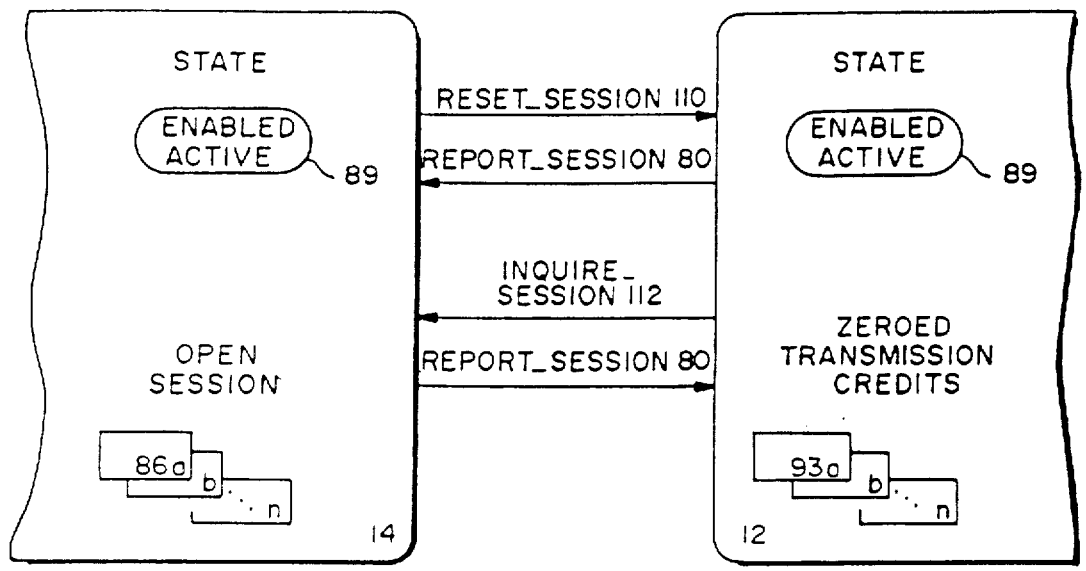

A RESET_SESSION command 110, and an INQUIRE_SESSION command are also provided as illustrated by FIG. 7. The RESET_SESSION command 110 is used to direct the receiving system to flush all existing buffers and zero the available transmit credits 92a, b, . . . n for either a specific session 86a, b . . . n or all sessions, depending on the Session ID parameter transmitted with the command in the parameter fields 47 (FIG. 2.) Also, the transmit credits 92 will be zeroed and buffers flushed for either the selected session 86a,b, . . . n, or all open sessions. This command may be used to reset the session management connections between the host system 12 and the terminal system 14 without having to close and reopen the existing open sessions. It may be used, for example, when the physical link forming the communications link 16 is temporarily broken and then reestablished, and the information in the buffers is no longer relevant to the current flow of information between the application processes 20, 22, 24 and the virtual terminals 26, 28, 30. A Session ID parameter is transmitted in the parameter fields 47 with this command to identify the session 86a, b, . . . or n to be reset. After a system has completed the reset session process, it transmits a REPORT_SESSION command 80.

The INQUIRE_STATUS command 112 is used to prompt the receiving system to send a REPORT_SESSION command 80 indicating whether a particular session 86a,b, . . . n is open.

Figure 8:
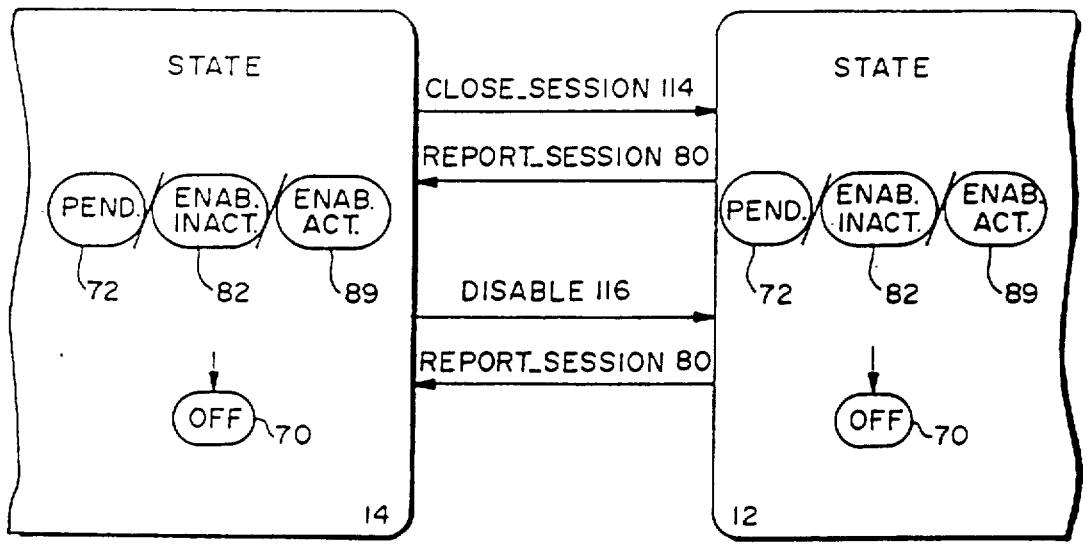

The protocol provides a CLOSE_SESSION command 114 to close a session 86a, b, . . . n, as is illustrated by FIG. 8. A Session ID parameter, in the parameter fields 47, (FIG. 2) is transmitted with this command 114 to indicate which session 86a,b . . . n is being closed. A Reason Code parameter is transmitted with this command, in the parameter fields 47 after the Session ID parameter, to indicate the reason the session is being closed. If the session is being closed as a result of a normal operation, the system receiving the command can discard all session information. Alternatively, if a session is terminated abnormally, such as, for example, by a power failure, the system receiving the command saves the session information, including the mappings and the available transmit credits, since there may be a later attempt to reactivate the session. After the receiving system performs the close session process, it transmits a REPORT_SESSION command 80.

A DISABLE command 116 is used to terminate use of the protocol. A pre-set, constant Disable parameter is sent with this command 116, in the parameter fields 47, (FIG. 2) to minimize the possibility another command or signal will be misinterpreted as a command to terminate operation under the protocol. After the system receiving the DISABLE command 116 has completed the disabling process, it transmits a REPORT_SESSION command 80. After the transmitting system receives the REPORT_SESSION command 80, it will transfer into the OFF state 70. After the receiving system, the one that received the DISABLE command 116, transmits the REPORT_SESSION command 116, it will enter the OFF state 70.

It is apparent that the REPORT_SESSION command 80 is used in a number of situations as in acknowledgement to verify that other commands have been properly received by the receiving system. In addition to a specific operation code field 46, each REPORT_SESSION command 80 includes Command Code, Session ID, and Status parameters in parameter fields 47 (FIG. 2). The Command Code parameter identifies the specific command the REPORT_SESSION is being sent in response to, and the Session ID identifies the session 86a, b, . . . or n the command was sent in reference to. The Status parameter indicates whether the operation required by the command was successfully completed, why the command cannot be completed, or the status of a particular session.

Both the host system 12 and the transmitting system 14 generally wait until a REPORT_SESSION command 80 is received, indicating successful execution of its previously-transmitted command, before they will take further action. This insures that the transmitting system does not take unilateral action after a command is sent that the receiving system is not ready for. An exception is that REPORT_SESSION commands 80 are not sent in response to ADD_CREDIT commands 94 since the continued transmission of the data fields 42 functions as an acknowlegement that the transmit credits 92a, b, . . . or n have been received.

In accordance with this protocol, each session management facility 32, 34 is set to expect a small delay between the time a command is sent and a REPORT_SESSION command 80 is received. This is to account for normal line and processing delays. However, if a REPORT_SESSION is not received, or indicates the command was not successfully executed, the transmitting session management facility 32 or 34 retransmits the command a number of times, so that any momentary line or processing errors which occur are not misinterpreted as a breakdown of the session management connection between the host system 12 and terminal system 14. In one embodiment, most commands are retransmitted up to three times if no response is received. On the other hand, if no responsive REPORT_SESSION command 80 is received within 10 seconds of the time of the first transmission, or if the response indicates the command cannot be executed, the situation will be classified as a breakdown of the session management connection. The session management facilities 32, 34 will then take appropriate action, or display the appropriate indication, in accordance with another protocol, not part of this invention.

In addition to the commands sent between the session management facilities 32 and 34, each facility must maintain protocol state information. Table 1 lists the state information that is maintained by each session management facility 32 and 34 for the protocol, and TABLE 2 lists the state information that is maintained for each open session. The state information is used by the session management facilities 32 and 34 to control and direct the flow of information in the data fields 42 between the application processes 20, 22, 24 and the virtual terminals 26, 28, 30.

TABLE 1

| Session Management Protocol State Information | |
|---|---|
| STATE INFORMATION | CONTENT |
| RECEIVED_COMMAND_BUFFER | To store received commands while previously received commands are processed. The size of the buffer is a function of the speed of command execution. |
| ENABLE_STATUS | Representative of the protocol's status within the system. |
| ACTIVE_TRANSMIT_SESSION | Identifies the session the system currently is transmitting a character stream to. |
| ACTIVE_RECEIVE_SESSION | Identifies the session the system currently is receiving a character stream from. |
| LAST_COMMAND_SENT | Indication of the last command transmitted by the session management facility. This is used for the purpose of receipt verification, time-out, and retransmission. |

TABLE 2

| Open Session State Information | |
|---|---|
| STATE INFORMATION | CONTENT |
| SESSION_ID | Session Identifier |
| OPEN_STATUS | Indicates session status. |
| SESSION_NAME | Name of session. This array may be empty depending on the contents of the OPEN_SESSION Session Name parameter. |
| SESSION_APPLICATION | Application of session. This array may be empty depending on the contents of the OPEN_SESSION Application Name parameter. |
| TRANSMISSION_CREDIT | A cumulative value indicating the number of characters which the system may transmit for the session. This value is incremented when transmission credits are received; decremented when a character is transmitted; and set to zero when a ZERO_CREDIT command is received. |

TABLE 2-continued

| Open Session State Information | |
|---|---|
| STATE INFORMATION | CONTENT |
| RECEIVE_CREDIT | A cumulative value indicating the amount of receiver buffer space currently available which has been extended as transmission credits. The value should be initialized to zero when the session is opened; incremented when transmission credits are sent; decremented when characters are received; and set to zero when a REPORT_SESSION response is received in response to a ZERO_CREDIT command. |
| RECEIVE_DATA_BUFFER | A buffer to accept received data characters. Transmission credits are extended based on the size of this buffer. Ideally, it should be twice the size of the maximum value for RECEIVE_CREDIT to allow for possible data overage. |
| LAST_COMMAND_SENT | An indication of the last command transmitted for this session. This code is used for the purpose of receipt verification, time-out, and retransmission. |

As previously described, the command introducer field 45 serves as a flag so the receiving session management facility 32 or 34 can detect the start of a protocol command. This feature is used when the session management protocol is contained in accordance with ENABLED, ACTIVE state 89 and either data fields 42 or command fields 44 may be transmitted over the communications link 16.

Figure 9:
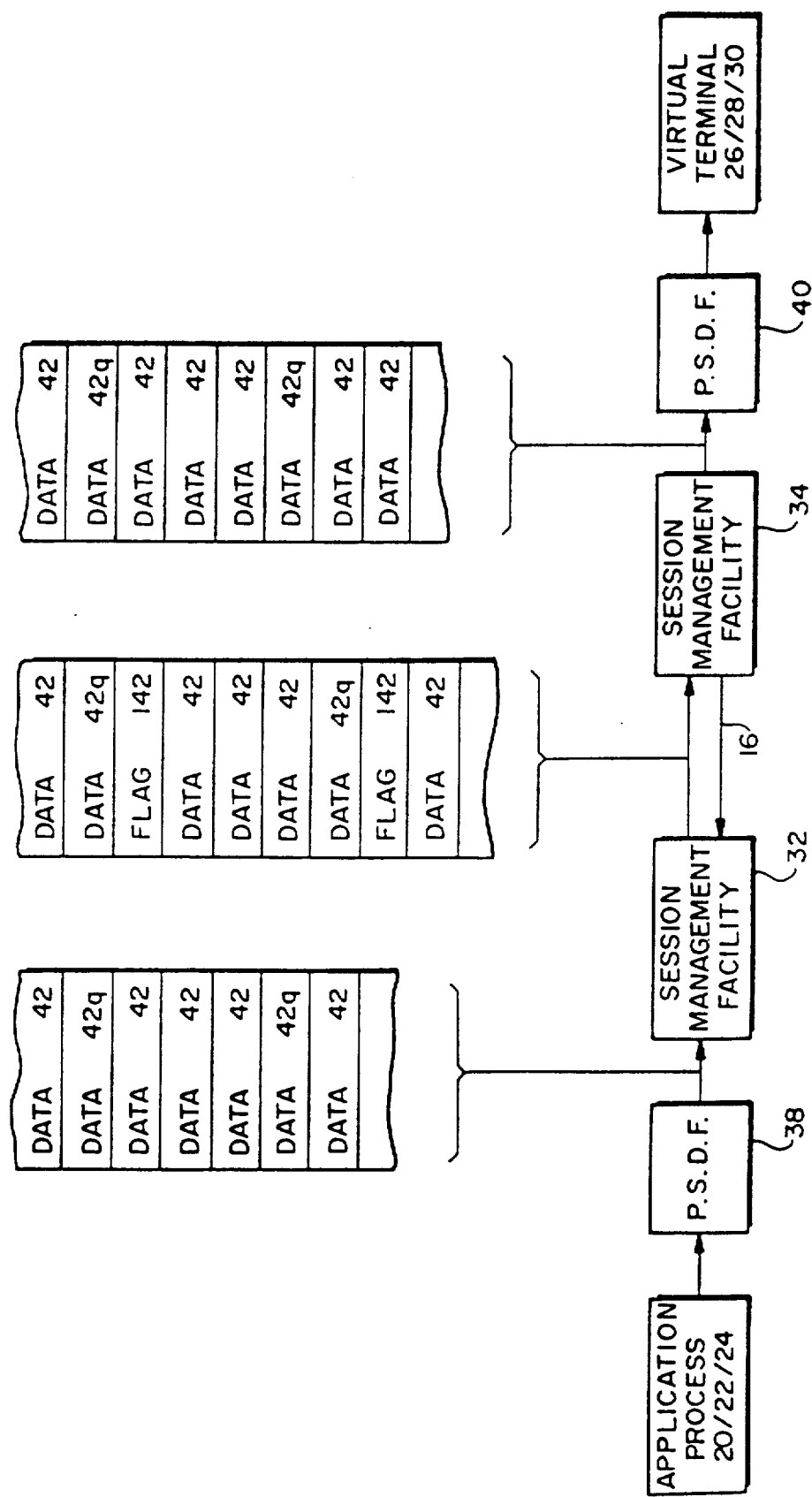
FIG. 9 is a diagram depicting the byte structure of data in which stuffing has occurred in transmission of information between systems in accordance with this protocol.

When the session management protocol is in the ENABLED, ACTIVE state 89, if the information transmitted in one of the data fields 42 is identical to the command introducer field 45, the session management facilities 32, 34 "byte stuff" the data fields prior to their transmission over the communications link 16, as depicted in FIG. 9. This prevents information that is being transmitted between the application processes 20, 22, 24 and the virtual terminals 26, 28 30 from being misinterpreted as protocol commands. Byte stuffing occurs when information in a data field 42q is identical to the command introducer field 45 and is transmitted between the host system 12 and the terminal system 14. The transmitting session management facility inserts, or stuffs, a flag field 142 immediately after the data field 42q, and both are transmitted over the communications link 16.

The flag field 142 serves as a signal to the receiving session management facility 34 or 32 that the preceding field 42q was a part of the information transmitted in the data fields 42 between the host system 12 and the terminal system 14, and not a command introducer field 45. The receiving session management facility removes the flag field 142 prior to forwarding the information to the receiving presentation data syntax facility 40 or 38. The removal of the field 142 insures that the receiving virtual terminal 26, 28, or 30, or application process 20, 22, or 24, is presented with information that is identical to that transmitted to it.

There are a number of advantages to providing session management between a host system 12 and a terminal system 14 in accordance with this protocol. After a session 86A,B . . . and has been open and selected, the transmitting session management facility does not send any other protocol commands to the receiving facility. Information may be continuously sent in the data fields 42, and their transmission not interrupted by the transmission of command fields 44. This increases the time available for transmission of information between the host systems 12 and the terminal system 14.

The use of the transmit credits 92 contributes to the efficiency of session management according to this protocol. The extending of transmit credits insures that the neither the host system 12 nor the terminal system 14 transmit information more rapidly than the receiving system can receive and use it. Moreover, ADD_CREDIT commands 94 are not acknowledged. There is no need to interupt the transmission of information in the data fields 42 to respond to receipt of ADD_CREDIT commands 94. Thus, the transmission of the data fields 42 does not have to be resynchronized each time an Add_Credit command is received.

Moreover, since the session management commands each are preceeded by a command introducer field 45, none of the information transmitted in the data fields 42 between the host system 12 and the terminal system 14 can be misinterpreted by the session management facilities 32 and 34 as protocol commands. If information similar to the command introducer field 45 is transmitted between the host system 12 and terminal system 14, the transmitting session management protocol facility will recognize it as such and stuff a flag field 142 behind it; the receiving session management facility 34 or 32 will recognize the flag field and unstuff it before the information reaches the recipient application process 20, 22, 24 or virtual terminal 20, 22, 24. Thus, the transmission of information in accordance with this protocol allows all forms of information to pass between the application processes 20, 22, 24 and the virtual terminals 26, 28, 30 over the communications link 16. This includes the transmission of data to and from application processes 20, 22, 24 on the host system 12, and the transmission of command instructions used to control the application processes.

Synchronization of session management connection between the host system 12 and the terminal system 14 is maintained, in part, by use of the REPORT_SESSION command 80 that is part of this protocol. This is because neither the host system 12 nor the terminal system 14 will take action until it receives a response indicating that the other system is ready for the action. For instance, after selecting a session, a transmitting system will not start transmitting data fields 42 until it receives a REPORT_SESSION command 80 indicating that the receiving system can accept them. This insures that neither system will take unilateral action that could result in the loss or erroneous transmission of information.

Another advantage of session management in accordance with this protocol is the capability of restoring session management through the restore sessions process. This insures rapid recovery if either the host system 12 or terminal system 14 breaks down and loses session management information. Also, the RESET_SESSION command 110 makes it possible to rapidly resynchronize session management between the host system 12 and the terminal system 14 if session management information is lost for just one, or all of, the sessions 86.

Moreover, it is relatively economical to implement session management control between a host system 12 and a terminal systems 14 in accordance with this protocol. It may be used with any connected host system and terminal 14 that have only relatively modest processing capabilities.

It is understood that this description is for the purpose of illustration only. Certain changes may be made in the above application without departing form the scope of the invention. For example, at a minimum, the protocol could be implemented in a situation where it responds to all commands and one system can only transmit SELECT_SESSION, ADD_CREDIT, ZERO_CREDIT, and VERIFY_CREDIT commands.

Moreover, the host system 12 and the terminal system 14 do not have to always include the specific components and operating sub-systems as described. One or more of the application processes 20, 22, 24 on the host system 12 may be a terminal device, and one or more of the virtual terminals 26, 28, 30 on the terminal system 14 may be an application process or other automated or semi-automated component.

Alternatively, some versions of the protocol may have an alternate scheme to insure data transparency. Therefore, it is intended that all matter contained in the above description or shown in the accompanying drawings be interpreted as illustrative and not in a limiting sense. It is also understood that the following claims are intended to cover all of the generic and specific features of the invention herein described.

What is claimed as new and desired to be secured by Letters Patent of the United States is:

1. A terminal system for interconnection with a host computer system, said terminal system comprising:
    at least one virtual terminal;
    means for receiving from said host computer system control commands, each of said commands identifying a selected one of said virtual terminals;
    means for receiving from said host computer system following each of said commands information for use by said virtual terminals and in response to the terminal identification contained in each of said commands directing to said selected virtual terminal all said information which is received from said host computer until a control command indicating the direction of information to another one of said virtual terminals is received.

2. A terminal system for interconnection with a host computer system, said terminal system comprising:
    at least one virtual terminal;
    means for receiving from said host first control commands, each of which establishes a session involving the transfer of information to a specified one of said virtual terminals;
    means for receiving from said host computer system second control commands each of which identifies a previously established session;
    means responsive to each of said second control commands, for transmitting to said host computer system a credit command, specifying the amount of information that said terminal system can receive without interruption; and
    means for receiving from said host computer system information for use by said virtual terminals and in response to the identification of a session in said second control command directing to the virtual terminal specified for that session, all said information received after the second control command until another second control command is received identifying another one of said sessions.

3. A terminal system for interconnection with a host computer system having at least one application process, said terminal system comprising:
    at least one virtual terminal;
    means for receiving from said host computer system terminal control commands, each terminal control command identifying a session involving a specific one of said virtual terminals;
    means for receiving from said host computer system information for use by said virtual terminals, and in response to each of said terminal control commands, directing to the virtual terminal involved in the session identified by that command all said information received until another terminal control command identifying another session is received;
    means for transmitting to said host computer system host control commands, each of said host control commands identifying a session involving a specific one of said application processes, and
    means for transmitting to said host computer system information for use by said application processes and for transmitting to said host system, after each host control command is transmitted, only information for use by the application process involved in the session identified by that command, without further identification of that process, until another host control command identifying another session is transmitted.

4. A terminal system, having at least one virtual terminal, for interconnection with a host system, having at least one application process, via a session management link to effect the transmission of information between a selected virtual terminal and a selected application process, said terminal system comprising:
    means for receiving the information and terminal session management commands, transmitted from said host systems via said session management link, said terminal session management commands including terminal select session commands each of which identifies a session involving a specific one of said virtual terminals, and
    means for responding to each of said terminal select session commands by directing to the virtual terminal involved in the session identified in that command all said information received after said command is received until another terminal_select session command identifying another session is received.

5. The terminal system defined in claim 4 further comprising:
    means for transmitting to said host system via said session management link host session management commands, including host select session commands each of which selects a session involving a specific one of said application processes at said host system; and
    means for transmitting to said host system after each transmitted host select session command only information for use by the application process involved in the session selected by said transmitted select session command, without further identification of that process, until another host select session command selecting another session is transmitted.

6. The terminal system defined in claim 5 further comprising means for transmitting a terminal session transmit credit command to said host system via said session management link, said terminal session transmit credit command defining a number of terminal transmit credits representative of the amount of information said terminal system can accept from said selected application process without interruption.

7. A terminal system, having at least one virtual terminal, for interconnection with a host system, having at least one application process, via a session management link to thereby effect the transmission of information between a selected virtual terminal and a selected application process, said terminal system comprising:
  means for transmitting to said host system via said session management link host session management commands, including host select session commands each of which identifies a session in which a specific application processes at said host system receives information; and
  means for transmitting to said host system after each transmitted host select session command information only for the application process specific to the session identified in that command, without further identification of said process, until another host select session command identifying another session is transmitted.

8. A terminal system, having at least one virtual terminal, for interconnection with a host system, having at least one application process, via a session management link to effect the transmission of information between a selected virtual terminal and a selected application process, said terminal system comprising:
  means for receiving the information and terminal session management commands, transmitted from said host systems via said session management link, said terminal session management commands including
  1) terminal open session commands each of which defines a session comprising an interconnection for transmitting information from a selected application process to a selected virtual terminal, and
  2) terminal select session commands each of which identifies a previously defined session in which a virtual terminal is to receive information
  means for storing identifications of the selected virtual terminals in association with identifications of the sessions to which they relate;
  means responding to each of said terminal select session commands and the contents of said storage means for directing to the virtual terminal associated with the session identified by that command all information received after the receipt of that command until another terminal select session command identifying another of said sessions is received;
  means for transmitting to said host system, host session management commands including
  1) host open session commands each of which defines a session comprising an interconnection for transmitting information from a selected virtual terminal to a selected application process, and
  2) host select session commands each of which identifies a previously defined session in which an application process is to receive information; and
  means for transmitting to said host system after each transmitted host select session command only information for the application process associated with the session identified by that command, until another host select session command identifying another session is transmitted.

9. A terminal system for interconnection with a host computer system by a session management link, said terminal system having at least one virtual terminal and said host computer system having at least one application process, said terminal system comprising means for transmitting to said host computer system host open session commands each of which defines a session with a specific one of said application processes at said host computer system and host
  select session commands each of which selects a previously defined session to be active, and means for transmitting to said host computer system following each of said transmitted host select session commands only information for the application process associated with the session selected by that command to be active until another host select session command selecting another one of said sessions is transmitted.

10. A terminal system for interconnecting with a host system by means of a session management link, said terminal system including a plurality of virtual terminals and said host system having at least one application process, said terminal system comprising
  a) means for receiving from said host system
    1. terminal session management commands, each of said terminal session management commands identifying a session in which a specific virtual terminal receives information from an application process, and
    2. information for the specific virtual terminal at said terminal system without further identification of said identified virtual terminal, and
  b) means directing all said information subsequent to a terminal session management command to the terminal specific to the session identified in that command at least until the completion of the transmission of information in the identified session.

11. The terminal system defined in claim 10 including means for
  a) transmitting to said host system host session management commands including host select session commands each of which identifies a session involving an application process at said host system which is to receive information from a virtual terminal and
  b) following each host session select command with the transmission to said host system of information only for the application process involved in the session identified in that command without further identification of that application process prior to the completion of said transmission of information.

12. A terminal system for interconnection with a host computer system by a session management link, said terminal system having a plurality of virtual terminals and said host computer system having at least one application process, said terminal system comprising:
  means for receiving from said host computer system via said session management link (1) a plurality of terminal session management commands, each of said terminal session management commands identifying a session involving a specific one of said virtual terminals, and, (2) following each of said commands, information for use by the specific virtual terminal, without further identification of said virtual terminal and;

means for directing said information which is received subsequent to the reception of a terminal session management command to the specific virtual terminal until the completion of the transmission of said information.

13. The terminal system defined in claim 12 further comprising:

means for transmitting to said host computer system host session management commands each of which identifies a session involving a specific one of said application processes at said host computer system, and transmitting to said host system following each of said transmitted host session management commands information only for the application process involved in the session identified in that command until another host session management command identifying another session is transmitted.

14. The identified virtual terminal defined in claim 12 further comprising means for transmitting to said host computer system a credit command specifying the amount of information that said terminal system can receive without interruption.

15. The terminal system defined in claim 14 further comprising means for transmitting to said host computer system during reception of said information further credit commands specifying increases in the amount of information that said terminal virtual terminal can receive without interruption.

16. The terminal system defined in claim 13 further comprising:
   a) means for receiving and storing a transmitted credit count representing the amount of information that said host computer system can receive without interruption,
   b) means for incrementing said stored count in accordance with additional credit counts received from said host computer system,
   c) means for decrementing said stored count in accordance with the amount of information transmitted to said host system, and
   d) means for inhibiting transmission of information to said host system when said stored count equals zero.

17. A method for interconnecting a terminal system with a host computer system by a session management link, said terminal system having at least one virtual terminal and said host computer system having at least one application process, said method comprising the steps of:

receiving from said host computer system via said session management link a plurality of terminal session management commands, each of said terminal session management commands identifying a session in which a specific virtual terminal receives information from an application process, and information for specific virtual terminals without further identification of the specific virtual terminals, and;

directing said information which is received subsequent to the reception of a terminal session management command to the virtual terminal specific to the session identified in that command at least until completion of the reception of information in the identified session.

18. The method defined in claim 17 further comprising the steps of:

transmitting to said host computer system host session management commands including host select session commands each of which identifies a session involving an application process, at said host computer system, which is to receive information from a virtual terminal; and following each host session select command with the transmission to said host system of information only for the application process involved in the session identified in that command without further identification of that application process prior to the completion of said transmission of information.

19. The method defined in claim 17 further comprising the step of transmitting to said host computer system a credit command specifying the amount of information that said identified virtual terminal can receive without interruption.

20. The method defined in claim 19 further comprising the step of transmitting to said host computer system during reception of said information further credit commands specifying increases in the amount of information that said identified virtual terminal can receive without interruption.

21. The method define in claim 18 further comprising the steps of:
   a) receiving and storing a transmitted credit count representing the amount of information that said host computer system can receive without interruption,
   b) incrementing said stored count in accordance with additional credit counts received from said host computer system,
   c) decrementing said stored count in accordance with the amount of information transmitted to said host system, and
   d) inhibiting transmission of information to said host system when said stored count equals zero.

22. A method for interconnecting a terminal system with a host computer system having at least one application process, said method comprising the steps of:

transmitting to said host computer system host session management commands, each of which identifies a session involving a specific one of said application processes; and transmitting to said host computer system following each of said transmitted host session management commands information only for the application process involved in the session identified in that command until another host session management commands identifying another session is transmitted.

23. A method for interconnecting a terminal system, having at least one virtual terminal, with a host system, having at least one application process, via a session management link to effect the transmission of information between a selected virtual terminal and a selected application process, said method comprising the steps of receiving information and terminal session management commands, transmitted from said host system via said session management link, said terminal session management commands including
   1) terminal open session commands each of which defines a session comprising an interconnection for transmitting information from a selected application process to a selected virtual terminal, and 2) terminal select session commands each of which identifies a session in which a virtual terminal is to receive information storing identifications of the selected virtual terminals in association with identifications of the sessions to which they relate responding to each of said terminal select session commands and the contents of said storage means for directing to the virtual terminal associated with the session identified by that command all information received after the receipt of that command until another terminal select session command identifying another of said sessions is received;

transmitting to said host system, host session management commands including 1) host open session commands each of which defines a session comprising an interconnection for transmitting information from a selected virtual terminal to a selected application process, and 2) host select session commands each of which identifies a previously defined session in which an application process is to receive information; and transmitting to said host system after each transmitted host select session command only information for the application process associated with the session identified by that command, until another host select session command identifying another session is transmitted.

24. A method for interconnecting a terminal system with a host computer system by a session management link, said terminal system having at least one virtual terminal and said host computer system having at least one application process, said method comprising the steps of transmitting to said host computer system host session open session commands each of which defines a session with a specific one of said application processes at said host computer system and host system select session commands each of which selects a previously defined session to be active, and transmitting to said host computer system following each of said transmitted host select session commands only information for the application process associated with the session selected by than command to be active until another host select session command selecting another one of said sessions is transmitted.

25. A method for re-establishing a session management link between a host system and a terminal system when session management information required for the session management link is lost, the host system having at least one application process and the terminal system having at least one virtual terminal, said method comprising the steps of:

transmitting to the host system a first control command requesting the establishment of a session management link;

receiving from the host system a second control command indicating that the host system has at least one application process open;

responding to said received second control command from the host system, by transmitting to the host system a third control command requesting the re-establishment of the previous session management link, and;

receiving from the host system a fourth control command enabling the terminal command to re-establish the session management information so that subsequent information received from the host system is directed to the proper virtual terminal.

26. A method for re-establishing a session management link between a host system and a terminal system when session management information required for the session management link is lost, the host system having at least one application process and the terminal system having at least one virtual terminal, said method comprising the steps of:

receiving from the host system a first control command for initiating the re-establishment of the session management link and the session management information;

receiving from the host system a second control command identifying at least one virtual terminal corresponding to at least one open application process at the host system, and;

re-establishing the session management information, for the session management link, so that subsequent information received from the host system is directed to the proper virtual terminal.

27. A method for re-establishing a session management link between a host system and a terminal system when session management information required for the session management link is lost, the host system having at least one application process and the terminal system having at least one virtual terminal, said method comprising the steps of:

receiving from the host system a first control command requesting a session management link be established;

transmitting to the host system a second control command indicating the terminal system has at least one virtual terminal open, and;

transmitting to the host system a third control command indicating which application process corresponds to each open virtual terminal.

28. Apparatus for re-establishing a session management link between a host system and a terminal system when session management information required for the session management link is lost, the host system having at least one application process and the terminal system having at least one virtual terminal, said apparatus comprising:

means for transmitting to the host system a first control command requesting the establishment of a session management link;

means for receiving from the host system a second control command indicating that the host system has at least one application process open;

means for responding to said received second control command from the host system, by transmitting to the host system a third control command requesting the re-establishment of the previous session management link, and;

means for receiving from the host system a fourth control command enabling the terminal system to re-establish the session management information so that subsequent information received from the host system is directed to the proper virtual terminal.

29. Apparatus for re-establishing a session management link between a host system and a terminal system when session management information required for the session management link is lost, the host system having at least one application process and the terminal system having at least one virtual terminal, said apparatus comprising:

means for receiving from the host system a first control command for initiating the re-establishment of the session management link and the session management information;

means for receiving from the host system a second control command identifying at least one virtual terminal corresponding to at least one open application process at the host system, and;

means for re-establishing the session management information, for the session management link, so that subsequent information received from the host system is directed to the proper virtual terminal.

30. Apparatus for re-establishing a session management link between a host system and a terminal system when session management information required for the session management link is lost, the host system having at least one application process and the terminal system having at least one virtual terminal, said method comprising:

means for receiving from the host system a first control command requesting a session management link be established;

means for transmitting to the host system a second control command indicating the terminal system has at least one virtual terminal open, and;

means for transmitting to the host system a third control command indicating which application process corresponds to each open virtual terminal.

* * * * *